United States Patent
Schüller et al.

(10) Patent No.: US 9,702,745 B2
(45) Date of Patent: Jul. 11, 2017

(54) CHARACTERIZING MULTIPHASE FLUID FLOW

(75) Inventors: Reidar Barfod Schüller, Drøbak (NO);
Lene Amundsen, Porsgrunn (NO); Pål Viggo Hemmingsen, Trondheim (NO);
Rainer Josef Hoffmann, Unterhaching (DE)

(73) Assignee: STATOIL PETROLEUM AS, Stavanger (NO)

( * ) Notice: Subject to any disclaimer, the term of this patent is extended or adjusted under 35 U.S.C. 154(b) by 628 days.

(21) Appl. No.: 14/239,519

(22) PCT Filed: Aug. 19, 2011

(86) PCT No.: PCT/EP2011/064321
§ 371 (c)(1),
(2), (4) Date: Mar. 27, 2014

(87) PCT Pub. No.: WO2013/026467
PCT Pub. Date: Feb. 28, 2013

(65) Prior Publication Data
US 2014/0216152 A1    Aug. 7, 2014

(51) Int. Cl.
*G01F 1/68*    (2006.01)
*G01F 1/684*   (2006.01)
*G01F 1/696*   (2006.01)
*G01F 1/74*    (2006.01)

(52) U.S. Cl.
CPC .......... *G01F 1/6847* (2013.01); *G01F 1/6965* (2013.01); *G01F 1/74* (2013.01)

(58) Field of Classification Search
CPC ... G01F 1/68; G01F 1/00; G01F 1/708; G01F 1/74; G01K 7/021; G01K 1/026; G01K 13/02; G01N 25/18
USPC ....... 73/204.11, 861, 861.95, 861.04; 702/45
See application file for complete search history.

(56) References Cited

U.S. PATENT DOCUMENTS

| 2,603,089 A * | 7/1952 | Morley | G01F 1/7044 73/861.95 |
| 5,233,868 A * | 8/1993 | Coats | G01F 1/6847 73/204.18 |
| 5,633,470 A * | 5/1997 | Song | G01F 1/74 73/152.42 |

(Continued)

FOREIGN PATENT DOCUMENTS

GB    2307047 A    5/1997

*Primary Examiner* — Lisa Caputo
*Assistant Examiner* — Nigel Plumb
(74) *Attorney, Agent, or Firm* — Birch, Stewart, Kolasch & Birch, LLP (57) ABSTRACT

A method and apparatus for determining multiphase flow characteristics inside production equipment containing at least two fluids. A pulse of heat from a heat source adjacent to the production equipment is provided, and a thermal response to the pulse is measured at each of a plurality of temperature sensors located adjacent to the production equipment. The thermal response measurement includes a time constant obtained from a measured decline in the temperature after the pulse of heat has been provided. The measured thermal responses are used to determine parameters of a fluid contained in the production equipment in proximity to each of the temperature sensors. The determined fluid parameters are in turn used to determine multiphase flow characteristics.

16 Claims, 4 Drawing Sheets

(56) References Cited

U.S. PATENT DOCUMENTS

| | | | | |
|---|---|---|---|---|
| 7,059,185 B2 * | 6/2006 | Gerhardt | ............... | G01F 1/6847 |
| | | | | 73/204.13 |
| 7,624,632 B1 * | 12/2009 | Hoyle | ................. | G01M 3/2807 |
| | | | | 73/204.11 |
| 7,755,466 B2 * | 7/2010 | Beck | ..................... | G01F 1/6845 |
| | | | | 257/419 |
| 7,826,991 B2 * | 11/2010 | Schumacher | ............ | G01K 3/06 |
| | | | | 702/98 |
| 2008/0016392 A1 * | 1/2008 | Earl | .................... | G06F 11/1048 |
| | | | | 714/6.12 |
| 2008/0163692 A1 | 7/2008 | Huang et al. | | |
| 2010/0312498 A1 * | 12/2010 | Hamann | ............... | G01F 1/6842 |
| | | | | 702/45 |

* cited by examiner

CHARACTERIZING MULTIPHASE FLUID FLOW

TECHNICAL FIELD

The invention relates to the field of characterizing multiphase fluid flow.

BACKGROUND

Oil and gas production pipelines may allow multiphase flow, in which more than one fluid is transported in the pipeline. This is advantageous because where more than one fluid is to be transported, only one pipeline is needed and no separation equipment is required. This is particularly advantageous in environments that are difficult to reach, such as sea beds and harsh climates, as the use of only one pipeline greatly reduces capital costs.

The different fluids flowing in the pipeline at the same time have different flow characteristics governed by their differing viscosities and densities. This makes it difficult to characterize multiphase flow. It is important to be able to characterize this with as the flow characteristics have an effect on plugging, corrosion and erosion of the pipeline. Plugging can occur by the formation of waxy deposits in the pipeline. In order to operate a multiphase flow pipeline safely it is therefore imperative to have a good knowledge about the flow characteristics in the pipeline. One of the more important flow characteristics is the phase distribution (sometimes termed flow regime) in the pipeline.

Flow characteristics are typically determined using empirical equations that have been tested using laboratory experiments. However, these equations are limited as they cannot take account of all of the variables that may be present in a working pipeline, such as inclination, variations in flow rate and so one. Furthermore, as the test rigs used to verify the empirical equations have significantly smaller diameters than production pipelines, the validity of the models for large diameter pipes is unknown.

Multiphase flow can also be predicted theoretically using models and equations but these suffer similar limitations to using empirical models.

GB2307047 describes a method of determining volumetric flow rates of gas and liquid in stratified flow. This requires using a flow meter or radioactive tracer to measure the flow of the liquid phase and a flow meter or temperature sensors to measure the flow of the gas phase in the multiphase flow. The system requires installing equipment within a pipeline, which is costly and disruptive.

US 2008/0163692 describes a system using thermal sensor probes for flow analysis in a multiphase pipeline. In this system, constant temperature is applied at different points around the pipeline, and the temperature difference between each heat source and the pipeline wall is measured using several heat sources and associated probes.

SUMMARY

The inventor has realised that there are drawbacks with using empirical equations to estimate flow characteristics, and the prior art methods are inaccurate or invasive and therefore expensive and disruptive. According to a first aspect, there is provided a method of determining multiphase flow characteristics inside production equipment containing at least two fluids. A pulse of heat from a heat source adjacent to the production equipment is provided, and a thermal response is measured at each of a plurality of temperature sensors located adjacent to the production equipment. The thermal response measurement includes a time constant obtained from a measured decline in the temperature after the pulse of heat has been provided. The measured thermal responses are used to determine parameters of a fluid contained in the production equipment in proximity to each of the temperature sensors. The determined fluid parameters are in turn used to determine multiphase flow characteristics.

In an optional embodiment, the time constant is compared with time constants previously measured for known fluids in order to characterize the fluid. The time constant is optionally compared with time constants for known fluids at any of a plurality of different temperatures and flowing at a plurality of different rates.

The method optionally comprises using the measured thermal response to determine a Prandtl number of a fluid in proximity to at least one temperature sensor of the plurality of temperature sensors. In this case, the method may optionally comprise comparing the determined Prandtl number with Prandtl numbers previously measured for known fluids in order to further characterize the fluid.

While the method may be applied to any time of production equipment, it is particularly suitable for applying to a pipeline that carries multiphase fluids.

According to a second aspect, there is provided apparatus for determining multiphase flow characteristics inside production equipment containing at least two fluids. The apparatus is provided with a plurality of temperature sensors adapted to be fitted to the production equipment at different locations. A heat source capable of providing a pulse of heat is also provided, the heat source being adapted to be fitted to the production equipment. A controller is provided for measuring a thermal response from each of the plurality of temperature sensors after a pulse of heat has been applied to the production equipment, the thermal response comprising a time constant obtained from a measured decline in the temperature after the pulse of heat has been provided. The controller is further adapted to use the measured thermal responses to determine parameters of a fluid contained in the production equipment in proximity to each of the temperature sensors, and use the determined fluid parameters to determine multiphase flow characteristics within the production equipment.

The controller is optionally further adapted to control operation of the heating element, although this may alternatively be accomplished using a separate controller.

As an option, the controller further comprises a database, the database storing previously measured thermal responses of known fluids.

The controller is optionally further adapted to calculate a Prandtl number of a fluid in proximity to at least one temperature sensor.

According to a third aspect, there is provided a computer device for determining multiphase flow characteristics inside production equipment containing at least two fluids. The computer device comprises an in/out device for receiving, from a plurality of temperature sensors in proximity to the production equipment, data indicative of a thermal response of a fluid in proximity to each temperature sensor in response to a pulse of heat. The computer device is also provided with a processor for calculating, for each temperature sensor, a time constant obtained from a decline in the measured temperature after the pulse of heat has been provided. The processor is further arranged to determine parameters of a fluid contained in the production equipment in proximity to each of the temperature sensors using each calculated time constant, and determine multiphase flow characteristics using the determined fluid parameters.

As an option, the computer device further comprises a database for storing time constants previously measured for known fluids under known conditions, the processor being further arranged to compare each measured time constant with a stored time constant in order to characterize the fluid.

The processor is optionally further arranged to determine a Prandtl number of a fluid in proximity to at least one temperature sensor of the plurality of temperature sensors.

As an option, the computer device further comprising a database for storing Prandtl numbers previously measured for known fluids, the processor being further arranged to compare the determined Prandtl number with the stored Prandtl numbers in order to further characterize the fluid.

As an option, the processor is further arranged to control operation of a heating element, the heating element being arranged to supply a pulse of heat to the production equipment.

According to a fourth aspect, there is provided a computer program, comprising computer readable code which, when run on a computer device, causes the computer device to behave as a computer device as described above in the third aspect.

According to a fifth aspect, there is provided a computer program product comprising a computer readable medium and a computer program as described above in the fourth aspect, wherein the computer program is stored on the computer readable medium.

DETAILED DESCRIPTION

Figure 1:
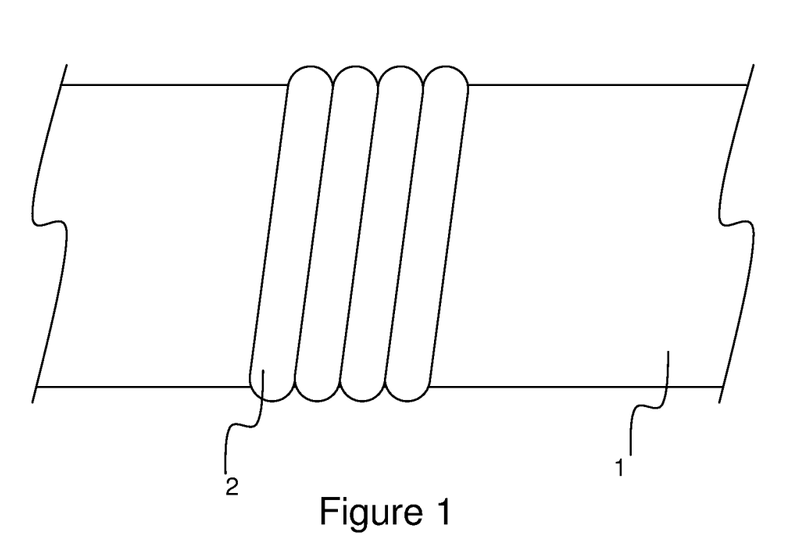
FIG. 1 is a side view of a pipeline and heating element according to an embodiment of the invention.

Referring to FIG. 1, there is illustrated production equipment 1 with a heating element 2 disposed around an outside wall of the production equipment 1. The production equipment 1 in this example is a pipeline, although the heating element 2 may be disposed around or adjacent to any type of production equipment.

Figure 2:
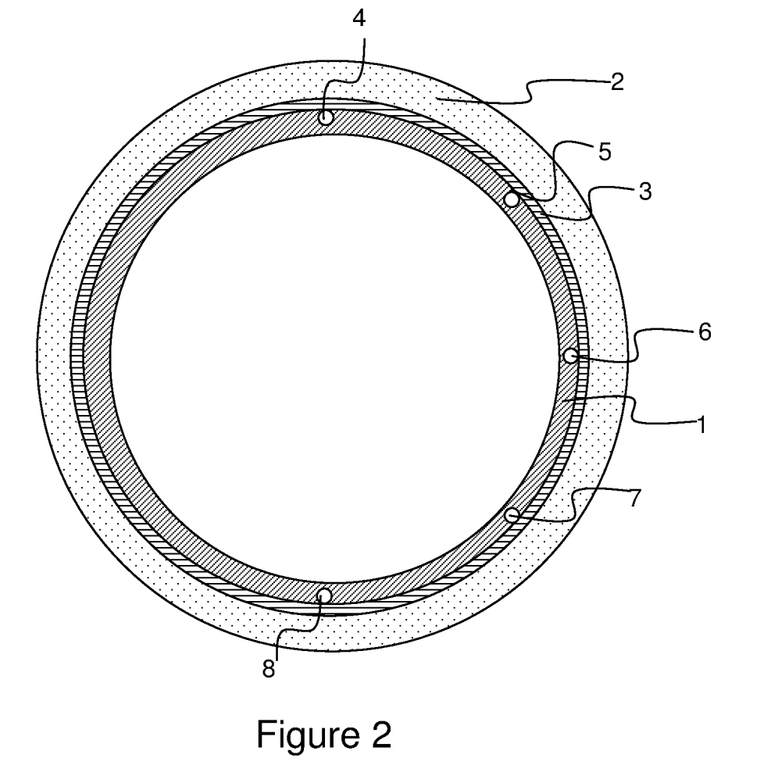
FIG. 2 is a cross-section view of a pipeline according to an embodiment of the invention.

Referring to FIG. 2, if can be seen that a heat conductive band 3 is disposed around the production equipment 1 and in contact with the heating element 2 to ensure that there is good thermal contact between the heating element 2 and the production equipment 1. The heat conductive band 3 may be made of any suitable material, such as copper or brass. A plurality of temperature sensors 4, 5, 6, 7, 8 are also disposed around the production equipment 1.

To ensure good contact between the temperature sensors and the production equipment 1, grooves may be introduced to an outer wall of the production equipment. Each groove is used to house a temperature sensor.

Figure 3:
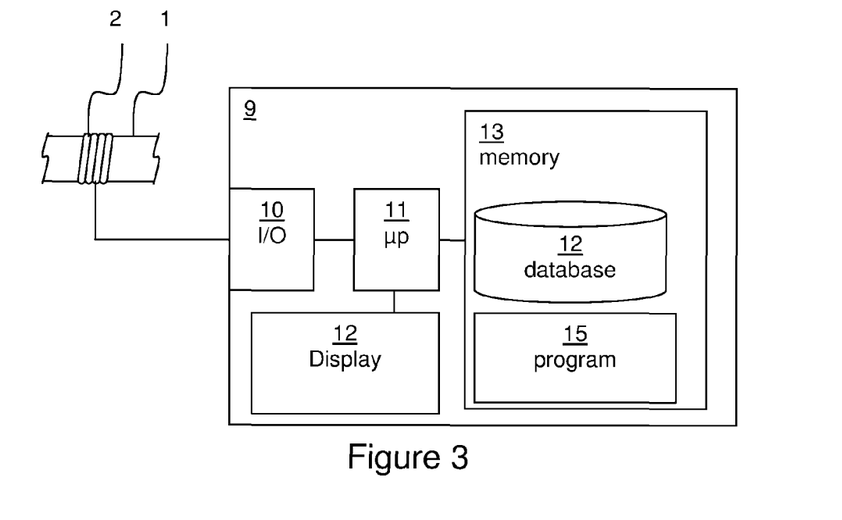
FIG. 3 illustrates schematically in a block diagram a system for characterizing multiflow regimes according to an embodiment of the invention.

Referring to FIG. 3, there is illustrated a system for characterizing multiphase flow. The heat sensors are connected to a computer device 9 using an In/Out device 10. The In/Out device 10 is used for sending instructions to the heating element 2 and for receiving data from the temperature sensors. A processor 11 is used for generating instructions to be sent to the heating element 2 to control operation of the heating element 2. The processor 11 is also used and for analyzing measurements taken from the temperature sensors. It will be appreciated that these functions may be implemented using different processors, but for the sake of clarity only one processor 11 is shown.

In this exemplary embodiment, a display 12 is also provided for allowing a user to see the results of the analysis of information from the temperature sensors. A computer readable medium in the form of a memory 13 is also provided. The memory 13 can be used for storing collected data, pre-programmed instructions for the heating element 2, and a database 14 of thermal responses and Prandtl numbers for a variety of fluids and fluid mixtures under different conditions. The memory 13 may also be used to store a program 15 that includes instructions to be executed by the processor.

Note that FIG. 3 illustrates a controller in the form of a computer device 9 connected to a single item of production equipment 1. It will be appreciated that a single computer device 9 may be connected to a plurality of items of production equipment, or to a plurality of heating elements disposed at different points on one or more items of production equipment in order to characterize multiphase flow in different items of production equipment or at different points on the same production equipment.

When the production equipment 1 contains a multiphase fluid, and it is required to in some way characterize the flow of the multiphase fluid, the processor 11 sends an instruction to the heating element 2 to provide a short heat pulse by turning on the heating element 2 for a short time. The time is selected to ensure that a reasonable temperature response can be obtained, which is based on the power of the heating equipment. When the heating element 2 is turned on, it begins to heat up and so heats up the walls of the production equipment 1. The heat is conducted through the walls and heats up the fluids contained within the production equipment 1.

When the heating element 2 is turned off, the temperature of the walls of the production equipment 1 starts to drop as the generated heat is dissipated into the fluid contained within the production equipment 1. The rate at which the temperature drops is dependent, among other things, on the nature of the fluid adjacent to the wall of the production equipment 2, and in particular on the heat transfer coefficient between the inner wall of the production equipment 1 and the fluid adjacent to the inner wall. The heat transfer coefficient depends on the Prandtl, $P_r$, number, which reflects the fluid's thermal properties. The Prandtl numbers for typically transported fluids (oil, gas, water) differ enough to show a significant difference in the measured thermal response.

The Prandtl number is dimensionless, as it is a ratio of momentum diffusivity to thermal diffusivity, and can be defined by:

$$P_r = \frac{\nu}{\alpha} = \frac{c_p \mu}{k} \qquad (1)$$

where v is kinematic viscosity, α is thermal diffusivity, μ is dynamic viscosity, k is thermal conductivity, $c_p$ is specific heat, and p is density. A low $P_r$ usually indicates that conductive transfer is a dominant mechanism of heat transfer, and heat diffuses quickly, whereas a high Pr usually indicates that convective heat transfer is a dominant mechanism of heat transfer, and heat diffuses less quickly.

It can be seen from FIG. 2 that in multiphase flow, a high density fluid is likely to be adjacent to the lower temperature sensors 7, 8 whereas a lower density fluid will be flowing adjacent to the higher temperature sensors 4, 5. This type of flow is termed stratified flow. The invention can be applied to other types of flow, but stratified flow is used as an example.

Figure 4:
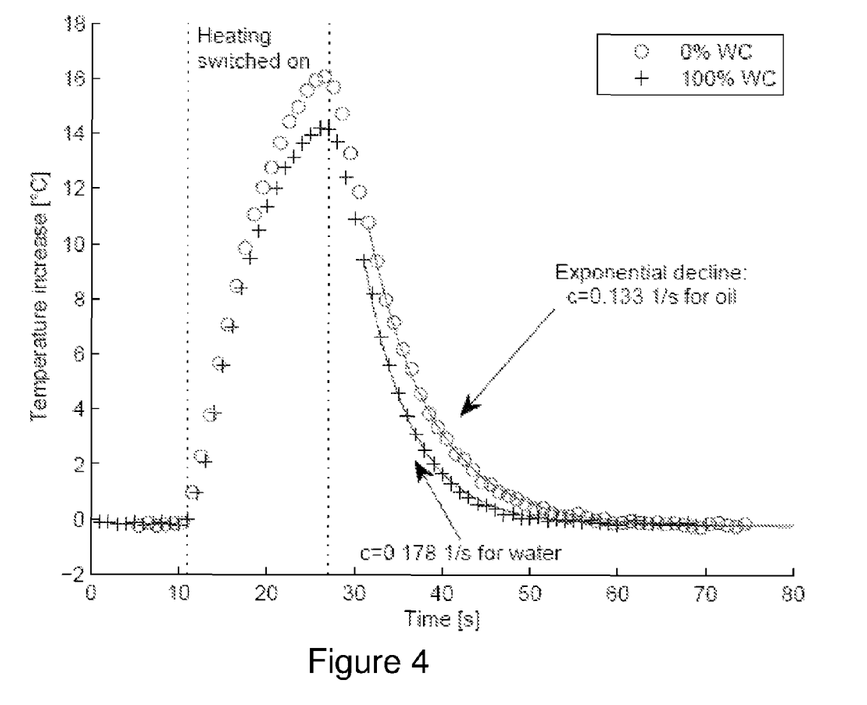
FIG. 4 is a graph showing a temperature response to a heat pulse for two sensors when measuring stratified multiphase flow.
Figure 5:
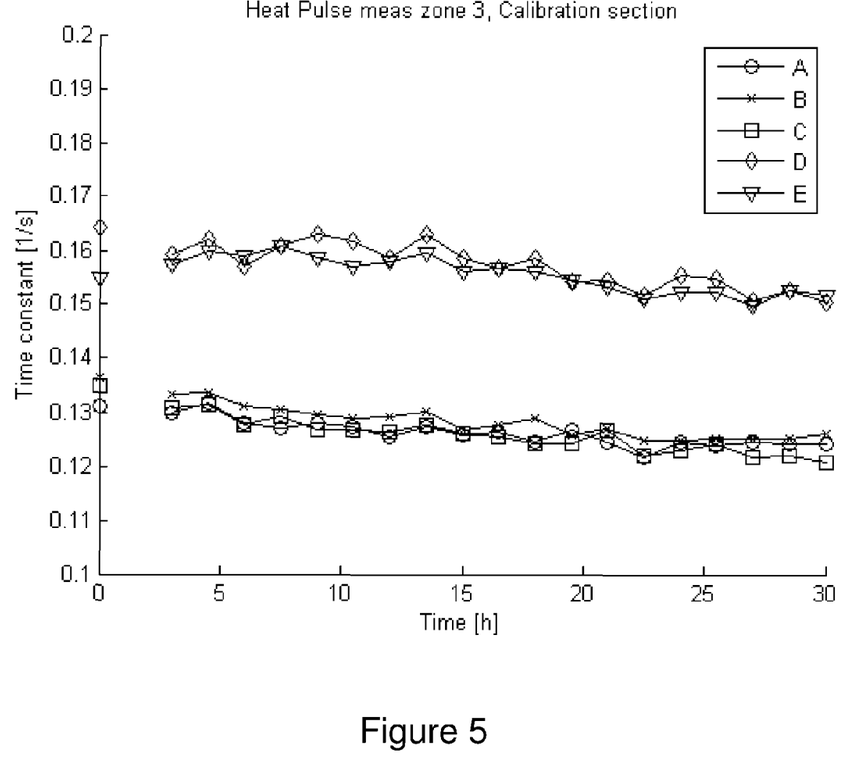
FIG. 5 is a graph showing a measured time constant for a plurality of sensors for stratified multiphase flow in a pipeline.

FIG. 4 shows the thermal response from temperature sensor 4 and temperature sensor 8 in an example in which the production equipment 1 is transporting oil and water in stratified flow. In this example, owing to the differing densities of the two fluids, temperature sensor 4 is adjacent to oil in the production equipment 1, and temperature sensor 8 is adjacent to water in the production equipment 1. A heat pulse of 20 seconds was applied. It can be seen that temperature at the sensor 8 adjacent to the water rose more quickly, reached a higher value, and fell more quickly than the temperature at the sensor 4 adjacent to the oil. This information can be used to assist in characterizing multiphase flow, or at least in determining which phases are present and at what points in the production equipment 1.

In order to improve the quality of the measurements, and reduce the signal to noise ratio, a time constant is extracted from the temperature response of each sensor from the exponential decline in temperature after the heat pulse. The exponential decline in temperature occurs shortly after the maximum temperature has been measured. Rather than measuring the time it takes to reach a certain temperature level, which would only use one temperature measurement point and introduce a great deal of uncertainty, determining the time constant from the exponential decline in temperature uses a large series of points and smoothes out corresponding errors.

In each simplest form the technique will return a result as shown in FIG. 4: If the phases expected in the production equipment are already known (in this case pure oil and pure water with no dispersion) then the flow regime can easily be determined. The time constant can be used to determine one or more parameters of the fluid, such as the type of fluid flowing in proximity to the temperature sensor.

Turning to FIG. 4, the time constant for each sensor 4, 5, 6, 7, 8 is shown. It can be seen that the time constant over a significant period of time for each temperature sensor 4, 5, 6 is around the same, whereas the time constant for temperature sensors 7 and 8 are similar to each other but different to the time constants of temperature sensors 4, 5 and 6. This clearly indicates a stratified flow with one fluid phase in the production equipment 1 up to at least the level at which temperature sensor 7 is located, and another fluid phase in the production equipment 1 above the level at which temperature sensor 7 is located.

The time constant can be used to characterize fluid flow, as it is affected by both the fluid properties and the flow velocity. For example, the time constant can be measured for single-phase flow (for each of the used fluids in turn) at different flow velocities. This can be used to generate a look-up table of time constants as a function of the type of fluid and the flow velocity. A measurement from a multi-phase flow can be subsequently looked-up in the table (the flow velocity has to be measured in parallel) to determine the phase distribution. This may be done manually or using a computer to give an indication of fluid flow.

If a reliable model of fluid flow within the measurement geometry is available, then the heat transfer coefficient can be calculated from the measurement result. The heat transfer coefficient depends on the Prandtl number and the Reynolds number. The Reynolds number is known, and no the Prandtl number can be determined. The Prandtl number can then be compared with the known Prandtl numbers of the expected fluids in the production equipment. Note that the material properties such as the Prandtl number are also dependent on the bulk temperature in the production equipment, so temperature needs to be known (either measured or simulated) and the material parameters need to be adjusted according to the current temperature.

If the phase distribution is not already known, for example, one phase may be a dispersion of oil in water, and another phase may be oil, then the time constant measured at each sensor is compared with a time constant previously measured for a known fluid that the production equipment is likely to contain. The time constant can vary according to the nature of the fluid, the flow rate of the fluid and the temperature of the fluid.

In this way, the characteristics of the fluid in proximity to each of the temperature sensors can be determined and a picture can be built of the location within the production equipment 1 that phases can be found. It will be appreciated that providing more temperature sensors located at different points around the production equipment 1 will result in a more accurate picture of phase distribution in the multiphase fluid flow within the production equipment 1.

Figure 6:
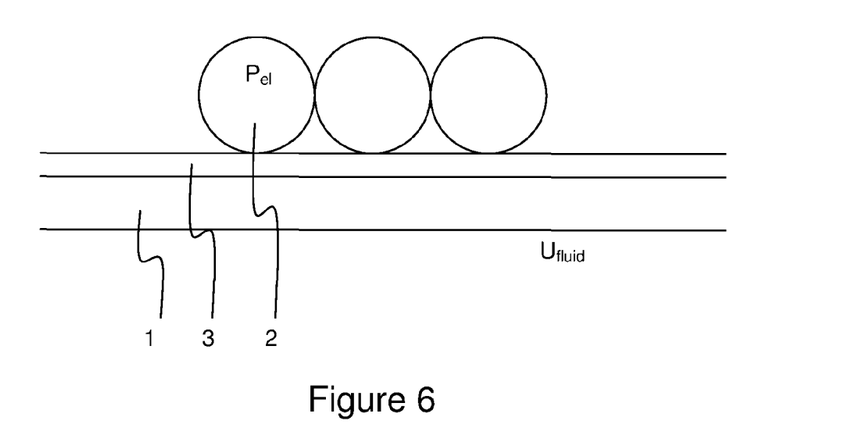
FIG. 6 is a finite element model of the Heat Pulse process according to an embodiment of the invention.

In order to get even more information to characterize the multiphase fluid flow, it is possible to calculate the Prandtl number of the fluid using the measured temperature response using a Finite Element Method (FEM) representation of the geometry, as shown in FIG. 6. Comparing the calculated Prandtl number with previously measured Prandtl numbers of the various fluids (e.g. oil/water dispersions at various water cuts) can be used to give an even more detailed picture of the phase distribution.

The simplified FEM model illustrated in FIG. 6 shows the wall of the production equipment 1, the heat conductive band 3 and the heating element 2. Fluid flow occurs on the side of the production equipment 1 wall to the heating element 2. The heating element 2 in this model is considered to be insulated from ambient temperature, and $U_{fluid}$ may be obtained for oil, water, or a mixture of fluids. Note that FIG. 6 illustrates a very simple geometry, and more complex geometries may be modelled. For example, a layer of wax deposits on the production equipment wall may be modelled.

Figure 7:
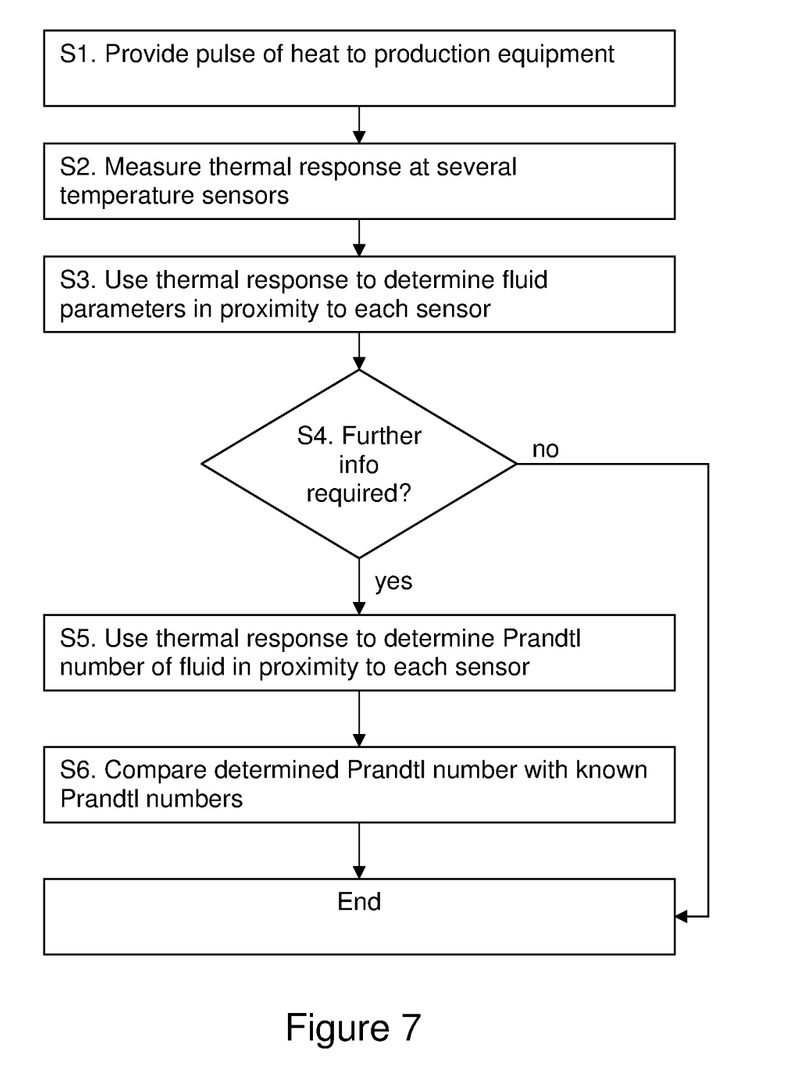
FIG. 7 is a flow diagram showing steps according to an embodiment of the invention.

Turning now to FIG. 7, there is a flow diagram illustrating the steps according to an embodiment of the invention. The following numbering corresponds to that of FIG. 7:

S1. A pulse of heat is applied to production equipment carrying multiphase fluid flow.

S2. The thermal response is measured at several temperature sensors disposed in proximity to the production equipment. A time constant is obtained for each sensor using the drop in temperature after a maximum is reached.

S3. The thermal response at each temperature sensor is used to determine fluid parameters, such as the nature of the fluid, in proximity to each temperature sensor. This may require comparing the thermal response with previously obtained thermal responses for known fluids under known conditions.

S4. If no further information is required, then the process ends.

S5. If further information is required, then the Prandtl number of the fluid in proximity to each temperature sensor is calculated using FEM.

S6. The Prandtl number calculated at each temperature sensor is compared with Prandtl numbers for known fluids.

The invention allows multiphase production equipment such as pipelines to operate more safely and more effectively, as the fluid flow in the production equipment can be monitored and any potential problems can be diagnosed. The technique is non-intrusive and so does not jeopardize pipeline integrity. Furthermore, it can be easily retrofitted to an existing pipeline at a later date without interrupting existing operations. The invention can therefore be used to monitor multiphase flow within production equipment such as a pipeline. Some types of flow can be destructive or damaging to a pipeline, and monitoring the multiphase flow can highlight any types of low known to be damaging. This allows remedial action to be taken before flow becomes too damaging.

It will be appreciated by the person of skill in the art that various modifications may be made to the above-described embodiments without departing from the scope of the present invention as defined in the appended claims. For example, while the examples given above apply to a pipeline, the invention may be used to characterize any type of production equipment for use in oil and gas production.

The invention claimed is:

1. A method of determining multiphase flow characteristics inside production equipment containing at least two fluids, the method comprising:
   providing a pulse of heat from a heat source adjacent to the production equipment;
   measuring a thermal response at each of a plurality of temperature sensors located adjacent to the production equipment, the thermal response comprising a time constant obtained from a measured decline in the temperature after the pulse of heat has been provided;
   using the measured thermal responses, determining parameters of a fluid contained in the production equipment in proximity to each of the temperature sensors; and
   using the determined fluid parameters, determining multiphase flow characteristics.

2. The method according to claim 1, wherein the time constant is compared with time constants previously measured for known fluids in order to characterize the fluid.

3. The method according to claim 1, wherein the time constant is compared with time constants for known fluids at any of a plurality of different temperatures and flowing at a plurality of different rates.

4. The method according to claim 1, further comprising using the measured thermal response to determine a Prandtl number of a fluid in proximity to at least one temperature sensor of the plurality of temperature sensors.

5. The method according to claim 1, further comprising using the measured thermal response to determine a Prandtl number of a fluid in proximity to at least one temperature sensor of the plurality of temperature sensors, and comparing the determined Prandtl number with Prandtl numbers previously measured for known fluids in order to further characterize the fluid.

6. The method according to claim 1, wherein the production equipment is a pipeline.

7. An apparatus for determining multiphase flow characteristics inside production equipment containing at least two fluids, the apparatus comprising:
   a plurality of temperature sensors adapted to be fitted to the production equipment at different locations;
   a heat source capable of providing a pulse of heat, the heat source being adapted to be fitted to the production equipment;
   a controller for measuring a thermal response from each of the plurality of temperature sensors after a pulse of heat has been applied to the production equipment, the thermal response comprising a time constant obtained from a measured decline in the temperature after the pulse of heat has been provided;
   wherein the controller is further adapted to use the measured thermal responses to determine parameters of a fluid contained in the production equipment in proximity to each of the temperature sensors, and use the determined fluid parameters to determine multiphase flow characteristics within the production equipment.

8. The apparatus according to claim 7, wherein the controller is further adapted to control operation of the heating element.

9. The apparatus according to claim 7, wherein the controller further comprises a database, the database storing previously measured thermal responses of known fluids.

10. The apparatus according to claim 7, wherein the controller is further adapted to calculate a Prandtl number of a fluid in proximity to at least one temperature sensor.

11. A computer device for determining multiphase flow characteristics inside production equipment containing at least two fluids, the computer device comprising:
    an in/out device for receiving, from a plurality of temperature sensors in proximity to the production equipment, data indicative of a thermal response of a fluid in proximity to each temperature sensor in response to a pulse of heat;
    a processor for calculating, for each temperature sensor, a time constant obtained from a decline in the measured temperature after the pulse of heat has been provided;
    wherein the processor is arranged to determine parameters of a fluid contained in the production equipment in proximity to each of the temperature sensors using each calculated time constant, and determine multiphase flow characteristics using the determined fluid parameters.

12. The computer device according to claim 11, wherein the processor is further arranged to control operation of a heating element, the heating element being arranged to supply a pulse of heat to the production equipment.

13. The computer device according to claim 11, further comprising a database for storing time constants previously measured for known fluids under known conditions, the processor being further arranged to compare each measured time constant with a stored time constant in order to characterize the fluid.

14. The computer device according to claim 11, wherein the processor is further arranged to determine a Prandtl number of a fluid in proximity to at least one temperature sensor of the plurality of temperature sensors.

15. The computer device according to claim 14, further comprising a database for storing Prandtl numbers previously measured for known fluids, the processor being further arranged to compare the determined Prandtl number with the stored Prandtl numbers in order to further characterize the fluid.

16. A computer program embodied on a non-transitory computer readable medium, comprising computer readable code which, when run on a computer device, causes the computer device to perform the steps of:
   receiving, from a plurality of temperature sensors in proximity to the production equipment, data indicative of a thermal response of a fluid in proximity to each temperature sensor in response to a pulse of heat;
   calculating, for each temperature sensor, a time constant obtained from a decline in the measured temperature after the pulse of heat has been provided;
   determining parameters of a fluid contained in the production equipment in proximity to each of the temperature sensors using each calculated time constant, and determining multiphase flow characteristics using the determined fluid parameters.

* * * * *